United States Patent [19]
Gold et al.

[11] Patent Number: 5,625,548
[45] Date of Patent: Apr. 29, 1997

[54] CONTROL CIRCUIT FOR CRYOGENICALLY-COOLED POWER ELECTRONICS EMPLOYED IN POWER CONVERSION SYSTEMS

[75] Inventors: Calman Gold, Londonderry, N.H.; Otward Mueller, Ballston Lake, N.Y.; Ellery F. Schempp, Medford, Mass.

[73] Assignee: American Superconductor Corporation, Westborough, Mass.

[21] Appl. No.: 288,086

[22] Filed: Aug. 10, 1994

[51] Int. Cl.[6] ................................................ H02J 15/00
[52] U.S. Cl. .................................................. 363/98
[58] Field of Search ............................... 357/83, 80, 81; 363/98, 14, 129, 137; 323/44; 307/22

[56] References Cited

U.S. PATENT DOCUMENTS

| | | | |
|---|---|---|---|
| 4,122,512 | 10/1978 | Peterson et al. | 363/14 |
| 4,695,932 | 9/1987 | Higashino | 363/14 |
| 5,010,304 | 4/1991 | Mueller et al. | 330/269 |
| 5,126,830 | 6/1992 | Mueller et al. | 357/83 |
| 5,347,168 | 9/1994 | Russo | 307/245 |

OTHER PUBLICATIONS

Okamoto et al., "Basic Studies on Application of Superconducting Magnetic Energy Storage to Wind Electric Conversion system," *Transactions of the Institute of Electrical Engineers of Japan*, 1993, Part B vol. 113–B, No. 7, pp. 760–767 (copy of translation attached).

Okamoto et al., "Basic studies on application of superconucting magnetic energy storage to wind electric conversion system," *Transactions of the Institute of Electrical Engineers of Japan*, 1993, Part B vol. 113–B, No. 7, pp. 760–767 (absstract attached).

Mueller et al., "Ultra–High Efficiency Power Conversion Using Cryogenic MOSFETs and HT–Superconductors," pp. 772–778, 1993.

*Primary Examiner*—Aditya Krishnan
*Attorney, Agent, or Firm*—Fish & Richardson P.C.

[57] ABSTRACT

A control circuit generates signals for controlling the sequence in which selected input signals are carried across the terminals of a polyphase switching conversion circuit. The control circuit includes switching elements galvanically isolated from the selected input signals with the control signals electrically isolated from the switching devices. The control circuit for the conversion circuit is, in essence, electrically isolated from the conversion circuit. The control circuit is configured to have a topology analogous to that of the switching converter and includes conventional switching diodes as well as a light generating device optically coupled to a light sensor which, in response to detection of light from the optically coupled light generating device, provides a control signal to a corresponding switching device. The control circuit also includes a source of regulated and electrically isolated power to operate drive circuitry for the switching devices. The cryogenically cooled switching converter is used to rectify AC input signals generated by a number of variable speed wind-driven turbines, into a DC output signal which can be re-converted into a fixed frequency AC signal, stored, or conveyed via a cryogenically cooled superconducting line to a remote location.

A power generation system includes cryogenically cooled power conversion circuitry for converting alternating current (AC) input signals which have naturally occurring, fluctuating frequency characteristics, into a direct current output signal. The control circuit, described above, may be used to control the power conversion circuitry.

15 Claims, 9 Drawing Sheets

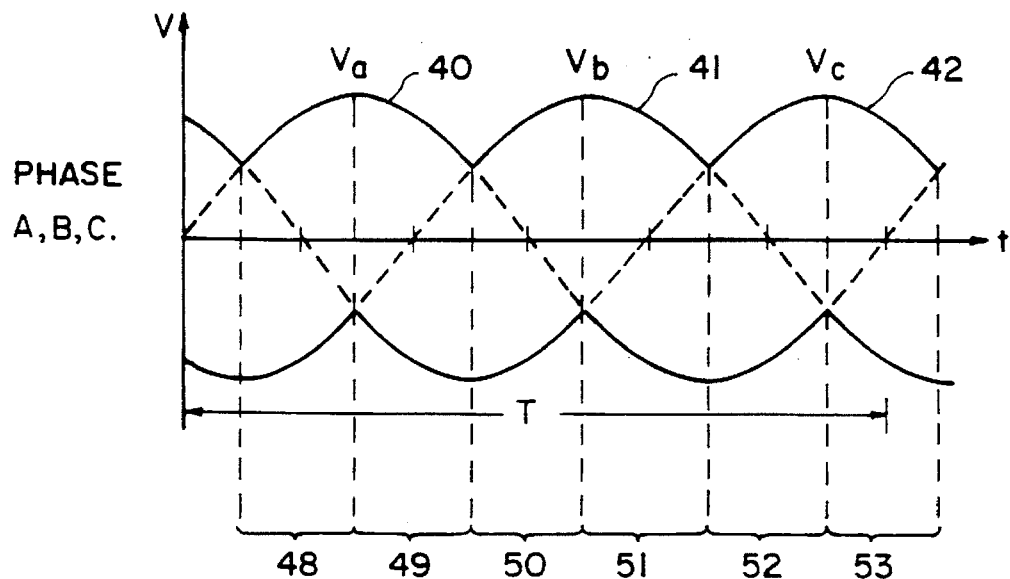
FIG. 4A
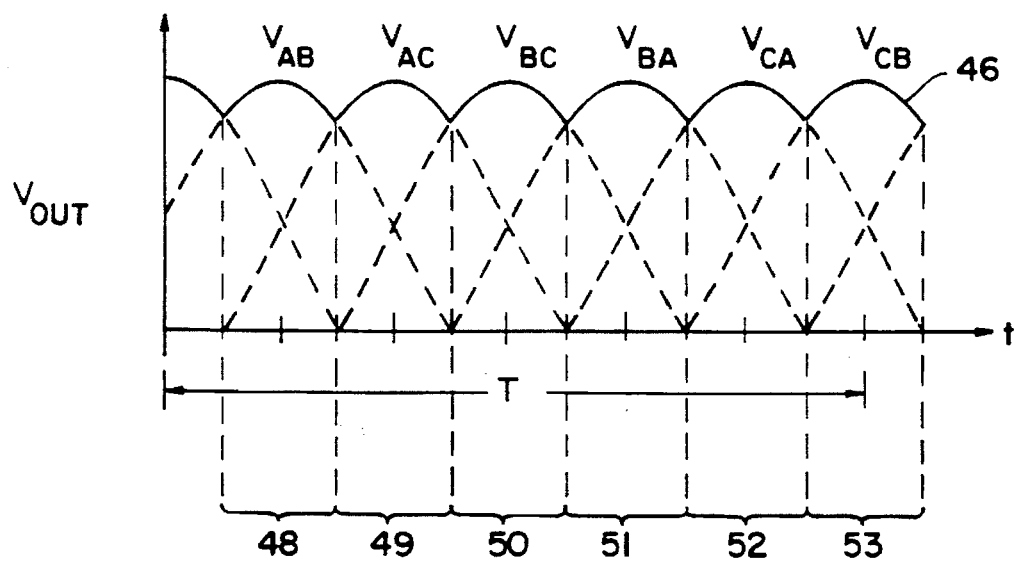
FIG. 4B
| INTERVAL | 48 | 49 | 50 | 51 | 52 | 53 |
|---|---|---|---|---|---|---|
| UPPER "ON" | 22 | 22 | 23 | 23 | 24 | 24 |
| LOWER "ON" | 26 | 27 | 27 | 25 | 25 | 26 |
FIG. 4C

CONTROL CIRCUIT FOR CRYOGENICALLY-COOLED POWER ELECTRONICS EMPLOYED IN POWER CONVERSION SYSTEMS

BACKGROUND OF THE INVENTION

The invention relates to power conversion electronics.

Alternating current (AC) has been almost universally adopted for utility power distribution and consequently is the standard form of electrical power for industrial, commercial, and domestic purposes. Independent of the source of energy used to generate the electricity (for example, hydroelectric, nuclear, solar, wind-power), AC must be provided at a fixed frequency of 60 Hz in North America (usually 50 Hz elsewhere) and phase-synchronized before being made available to the large power grid from which users obtain electricity.

Most utility electrical power is generated and distributed as three-phase power for a number of reasons. Unlike single-phase power, the instantaneous power of three phase (or any balanced polyphase system) is constant. Moreover, the output voltage of a polyphase rectifier is smoother than that of single-phase rectifiers when no filter is used with either. The utilization of transformers and other associated equipment is also improved in polyphase circuits over those with single-phase circuits, and generally results in improved power factor and reduced harmonic distortion.

Semiconductor-based power electronic converters are often used to conform the electrical power generated from various power sources to the 60 Hz fixed frequency, phase-synchronized AC required by the grid. These power converters generally rectify variable-frequency, variable-phase AC power to DC and then convert (invert) the DC back to AC at 60 Hz. Such, rectifier/inverter circuits are also widely used in adjustable speed drives (ASDs) for electric motors, and a number of different design topologies are in use, all of which require an energy storage element to link the converter to the inverter. Unfortunately, the AC-DC-AC rectification/inversion process wastes a portion of the generated power due primarily to the dissipation occurring within the large energy storage devices (e.g., inductors) and within the semiconductor devices themselves.

It is desired that any losses associated with the conversion and regulation of the high power generated in such utility systems be minimized. Synchronous rectifiers may be used in such systems as a means for reducing the losses in rectifying AC to DC. The general concept of synchronous rectification entails the substitution of a low resistance semiconductor switch for each conventional diode element in any one of a number of known rectification circuit topologies. In larger industrial power applications, this may potentially result in savings of tens to hundreds of kilowatts of dissipated power over conventional diode rectifier arrangements. Conventional high power diode rectifiers exhibit a slow recovery time when commutating from a conducting state to a reverse blocking state. This slow recovery time results in a brief interphase short circuit condition between individual rectifiers during the diode transition times. The result is a momentary reduction in interphase voltage. This phenomenon is known as "line notching" and requires additional filtering to reduce harmonic pollution of the utility lines. It is important in the application of synchronous rectification that the semiconductor switch commutation intervals not differ from the natural commutation intervals of the conventional diode rectifier circuit topology chosen. That is, forced commutation is generally not permissible as it results in an interphase short circuit.

In single-phase synchronous rectification, the control strategy for the switch operation is derived very simply by a comparison operation which selects one or another switch based on the instantaneous polarity with respect to a common reference of the single-phase voltage to be rectified. In switchmode power supplies operating for example at low voltage and low power levels, the control and gate drives for the switches are identical and are typically derived from the output winding of the transformer providing the source of voltage to be rectified.

On the other hand, with polyphase rectification, the commutation intervals are considerably more complex and cannot be determined on the basis of polarity of the input voltage. Instead, the rectifier commutation points occur at intervals determined by the transitions at which a particular phase voltage becomes most positive or most negative with respect to the other input phases. The complexity increases when considering, for example, 48 pulse (24 phase) rectification which is commonly employed to reduce output ripple in the rectified DC voltage.

SUMMARY OF THE INVENTION

This invention features, in one general aspect, a control circuit including a plurality of commutating switching elements, each controlling a corresponding one of a plurality of commutating switching devices of a polyphase switching conversion circuit for applying an input signal across an output load of the conversion circuit. Each commutating switching element is responsive to a timing signal for generating control signals, each control signal controlling a corresponding one of the switching devices, and each control signal being electrically isolated from the switching devices. The control circuit is relatively simple and robust with individual switching elements generating control signals necessary for switching a corresponding higher voltage switching device. The control circuit typically has a circuit configuration derived from the circuit configuration of the conversion circuit and provides electrically isolated logic transmission to appropriate circuitry for driving the high power switching devices of the conversion circuit. In certain applications, electrical isolation of the control signals from the switching devices may not be required.

In preferred embodiments, the invention may include one or more of the following features. The timing signal is galvanically isolated (i.e., DC isolated) from the input signal(s) and has a voltage level less than the voltage level of the input signal(s). Thus, the control logic for generating the control signals is protected from the larger level signals being switched by the switching devices of the conversion circuit. A cryogenic cooling system, for example, a cryogenic refrigerator or liquid cryogen bath, cools the control circuit to cryogenic temperatures resulting in improved electrical performance of the control circuit and the polyphase switching conversion circuit which it controls. For example, the switching conversion circuit includes MOS devices, preferably MOS field effect transistors (MOSFETs), which are not only operational, but exhibit enhanced electrical characteristics at cryogenic temperatures. For example, it has been observed that cryogenically cooling certain MOSFET devices significantly decreases their on-resistance as well as their switching times. Moreover, the reverse recovery time of the intrinsic diode disposed between the drain and source of such MOSFETs is also significantly reduced at cryogenic temperatures. In effect, these improvements provide the performance of a fast recovery, high current, high voltage rectifier diode which is presently neither commercially feasible nor available when operated at room temperatures. Improving these electrical characteristics results in a substantial reduction in the power dissipated within the devices allowing them to be operated at higher current levels. Indeed, the cryogenically-cooled MOSFETs may be operated at current levels exceeding the specified maximum rating when operated, at normal ambient temperatures, with conventional heat sinks and air or water cooling systems.

The control circuit includes a photonic device for generating the control signal to a corresponding one of the plurality of switching devices. The photonic device, for example, a light emitting diode, is optically coupled to a corresponding one of the plurality of switching devices. In particular embodiments, the switching devices of the conversion circuit are photodetecting switching devices responsive to a wavelength of light emitted by the photonic devices. Alternatively, a sensor, such as a photocontrolled switching MOSFET or JFET, is optically coupled to a corresponding photonic device for driving a corresponding switching device in response to detection of light from the photonic device.

The control circuit includes driver circuitry for providing drive signals to the switching devices in response to detection of light from the optically coupled photonic device. The control circuit includes an auxiliary power supply providing a source of regulated and electrically isolated power to operate the gate driver circuitry.

In a particular embodiment, the input signal is a direct current input signal carried by a DC-AC conversion circuit, with the switching devices responsive to the control signals for generating an alternating current output signal across the output load of the conversion circuit.

In an alternate embodiment, the input signal is a plurality of alternating current input signals having a differential phase shift relationship with respect to each other. In this case, the switching devices of an AC-DC conversion circuit are responsive to the control signals for carrying a selected pair of a plurality of alternating current input signals across the output load of the conversion circuit to generate a DC output. For example, the conversion circuit may be a three-phase synchronous rectifier with the differential phase shift between the plurality of alternating current input signals being 120° to generate the DC output signal. An important advantage of the control circuit in this application is that the control signals are synchronized with the much higher voltage AC polyphase mains. Moreover, the phase reference for the operation of the control circuit is derived locally from the source to be rectified, which permits the use of the control circuit with polyphase sources which have been derived by means of multiple transformer windings. In other words, the phase shift inherent in, for example, a delta-wye transformer is immaterial if the reference for the control circuit is derived from the wye supplying the power to be rectified. Moreover, the concept is extendable to any polyphase AC source or sources.

The polyphase switching conversion circuit includes a cryogenically cooled inverter for converting the direct current output signal into an alternating current signal at a preselected frequency, for example 60 Hz. The polyphase switching conversion circuit includes a low pass output filter circuit, coupled at the output of the rectifier to reduce ripple and harmonics of the rectified DC signal. An output filter may also be coupled to reduce harmonics of the inverted AC signal. The filter circuits include inductors fabricated with high temperature superconducting windings with the filter being cooled by the cryogenic refrigerator or liquid cryogen bath.

The invention features, in another aspect, cryogenically cooled power conversion circuitry for converting alternating current (AC) input signals, generated by power generators, which have naturally occurring, fluctuating frequency characteristics, into a direct current output signal.

A power generation system consists of a source of power (steam, flowing water, wind, solar insolation, etc.), one or more electrical generators, and various regulation and control systems. A feature of many non-traditional (sometimes called "renewable energy" sources) power generation system is that the source of power is naturally variable, as for example in wind farms or tidal generating arrays. Depending on the nature of the electrical generators, such fluctuations may result in power being generated as variable-frequency, variable-phase AC that cannot be directly injected into the mains grid. Another feature encountered in solar cell arrays is that the electricity is generated as DC, which cannot be injected into the mains grid until it is converted to AC at a fixed frequency and phase. The same applies to large battery arrays, which, while not generators of electricity, are sources of electrical power during their discharge. Thus, power generation systems based on such non-traditional energy sources usually require additional power conversion systems, consisting as necessary of AC-DC-AC rectifier-inverters or DC-AC inverters.

The power generated by variable phase, variable frequency AC sources is generally not added directly because positive portions of the AC waveform can be cancelled in whole or in part by negative portions of the waveform. Thus, power generated by multiple AC sources is generally converted into DC and then summed. The naturally occurring, fluctuating frequency characteristic of such alternating current input signals is a result of the nature of the source of energy powering the generators. For example, the power generators may be variable speed turbines driven by wind, tidal, or geothermal energy sources which generate power at a frequency and amplitude related to the momentary speed of the wind, water, etc. or which otherwise vary as the source power fluctuates.

Preferred embodiments include one or more of the following features. The cryogenic power electronics includes a cryogenically cooled transmission line for conveying the direct current output signal to a remote load. The power conversion circuitry is a polyphase switching conversion circuit including a plurality of switching devices and the plurality of alternating current input signals have a differential phase shift relationship with respect to each other. The switching devices of the conversion circuit are responsive to the control signals for carrying a selected pair of the plurality of alternating current input signals across the output load of the conversion circuit. The differential phase shift between the plurality of alternating current input signals is 120° in a three-phase system. A digital control circuit is used to control the polyphase switching conversion circuit. Alternatively, a control circuit having a plurality of switching elements, each generating a control signal to a corresponding one of the switching devices for carrying at least one input signal across an output load of the converter circuit, the control circuit galvanically isolated from the at least one input signal and the control signal electrically isolated from the at least one input signal.

In a particular embodiment, the cryogenic power electronic assembly includes rectifier circuits each converting alternating current input signals into direct current signals which are summed to provide a total direct current signal. In a preferred embodiment, a superconducting magnetic energy storage device, such as a DC-link inductor, is coupled to the output of the rectifier circuits. Thus, high efficiency AC-DC conversion is provided.

The combined DC output signal may be used immediately or, alternatively, stored in a superconducting energy storage device for later use. The superconducting energy storage device may be an inductor winding composed of a high temperature superconductivity material, a cryogenic capacitor or a superconducting magnetic energy storage device (SMES). On the other hand, a DC/AC inverter may be used to convert the DC to a fixed frequency output AC (e.g., 60 Hz) before being supplied to a frequency- and phase-synchronized power grid. The rectifier and inverter circuits include cryogenically cooled MOSFET devices exhibiting the enhanced electrical characteristics as described above.

A cryogenically-cooled low pass output filter circuit is coupled to an output terminal of the inverter circuit and includes one or more high temperature superconducting inductor windings, and preferably, one or more capacitors, which may also be cryogenically cooled, for reducing the harmonic content of the inverter output. The power generating system is capable of providing at least 10 kilowatts of power.

As mentioned above, cryogenically cooling the power conversion electronics improves certain electrical and thermal characteristics of the devices used in converting the AC to DC. Moreover, cryogenically cooling the power conversion electronics generally adds little expense to the system, since a cryogenic container is already being provided to cool a superconducting inductor or superconducting magnetic energy storage (SMES) used as part of a power conversion system. The significant reduction in power dissipation within the devices and the reduction in generated heat from the devices increases their reliability and efficiency, thereby reducing the cost of operating and maintaining the power conversion system. Thus, a significant improvement in the overall power efficiency of the power conversion system is achieved beyond that provided by cryogenically cooling the energy storage elements which are commonly used in such systems.

In another aspect of the invention, a cryogenically cooled superconducting energy storage device stores direct current input signals having naturally occurring, fluctuating amplitude characteristics, for example, from a solar panel array. The superconducting energy storage device is discharged as desired for later use.

Preferred embodiments include the following features. Power conversion circuitry is used to convert the discharged direct current input signal from the superconducting energy storage device into an alternating current output signal.

BRIEF DESCRIPTION OF THE DRAWINGS

FIGS. 4A–4B illustrate the input and output waveforms, respectively, for the three-phase synchronous rectifier circuit.

FIG. 4C is a table showing the conduction pattern of the MOSFETs used in the rectifier circuit of FIG. 3.

DESCRIPTION OF THE PREFERRED EMBODIMENTS

Figure 1:
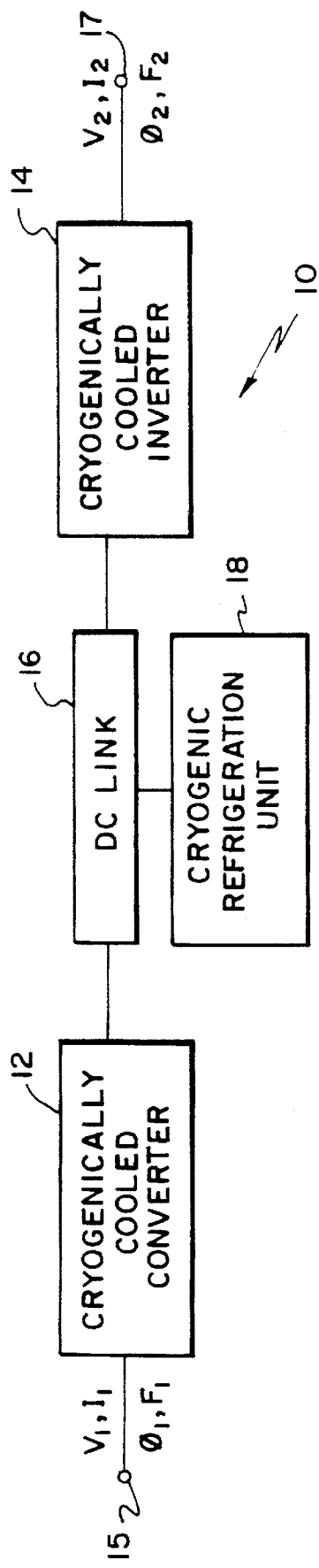
FIG. 1 is a block diagram of a cryogenic power conversion system in accordance with the invention.

Referring to FIG. 1, a cryogenic power conversion system 10 includes a cryogenically-cooled AC/DC converter (rectifier) 12 and a polyphase (multi-phase) cryogenically-cooled inverter 14 coupled to rectifier 12 through a DC link inductor 16. Rectifier 12, inverter 14, and DC link inductor 16 are all cooled to a temperature of less than 120° K, and preferably about 77° K, using a cryogenic refrigeration unit 18. AC/DC converter 12 receives, at a terminal 15, an AC signal source having voltage ($V_1$), current ($I_1$), frequency ($F_1$), and phase characteristics ($\phi_1$), which may all be varying with time. The input AC power is rectified to provide a DC signal and then provided, through DC link 16, to inverter 14. The DC signal is reconverted to provide an AC signal with a desired voltage ($V_2$), current ($I_2$), frequency ($F_2$, e.g., 60 Hz), and phase characteristic ($\phi_2$).

DC link inductor 16 maintains what appears to be a fairly constant flow of power to inverter 14. In high power conversion applications, in which semiconductor devices are used within converter 12 and inverter 14, the current handling capability rather than the voltage, is generally increased as the required power level increases. This is because the voltage ratings of the semiconductor devices used in converting the relatively high power signals (e.g., tens of thousands of kilowatts) are limited to several thousand volts. In order to reduce the relatively large $I^2R$ losses and the IR voltage drop in its windings, DC link inductor 16 is fabricated from a high temperature superconducting material and cryogenically cooled.

Figure 2:
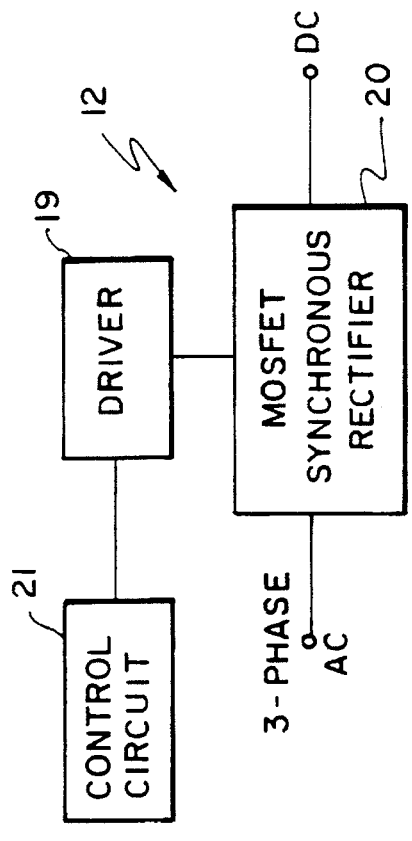
FIG. 2 is a block diagram of a synchronous rectifier of the power electronics assembly.

Referring to FIG. 2, converter 12 is polyphase, illustrated as a three-phase synchronous rectifier 20 utilizing MOSFET switching devices in a commutation switching arrangement. As will be described in greater detail below, the sequence in which each MOSFET device is switched on and off is dictated by control signals applied through an integrated circuit driver 19 from a control circuit 21 to the gate terminals of each MOSFET.

Figure 3:
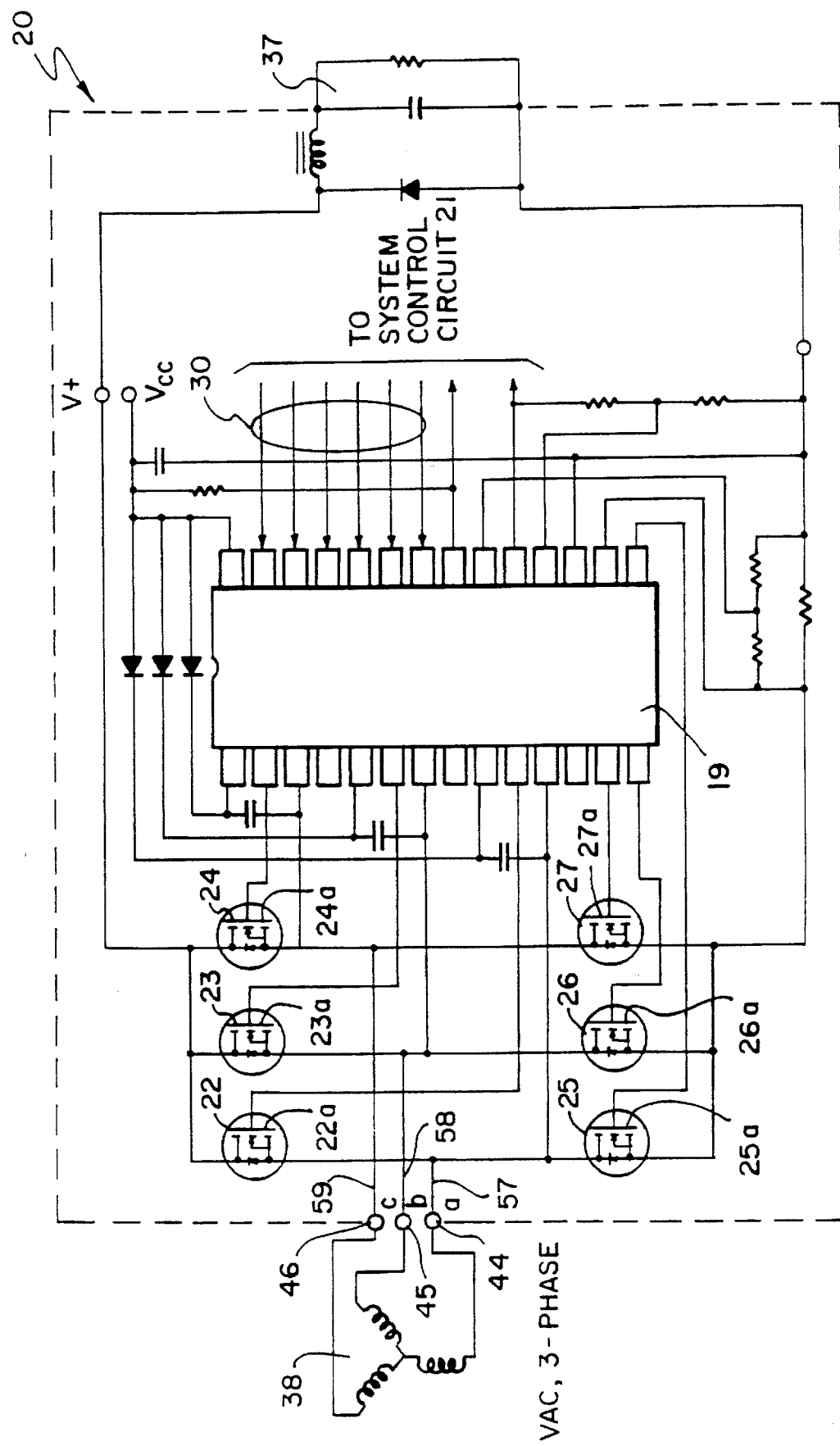
FIG. 3 is a schematic diagram of a three-phase synchronous rectifier circuit.

Referring to FIG. 3, a three-phase rectifier 20 includes six individual MOSFET devices 22–27 in a "full-wave" arrangement, with each MOSFET 22–27 conducting for ⅓ of the full wave cycle (i.e., 120 degrees). The integrated circuit driver 19 (for example, Model No. IR2130, International Rectifier Corp., El Segundo, Calif.) serves as a voltage and current buffer between the control circuit 21 (FIG. 6) and MOSFETs 22–27, and also generates the drive signals, provided to gates 22a–27a, necessary to switch the MOS- FETs between on and off states in response to control signals provided along input lines 30.

Referring to FIGS. 4A–4B, the waveform of the output voltage is determined from a consideration of the voltage waveforms at the secondary of a transformer 38 (FIG. 3). As shown in FIG. 4A, transformer 38 provides three AC waveforms 40–42 having a differential phase of 120° from each other. MOSFETs 22–27 conduct in pairs to provide a path for current through the secondary of transformer 38, with each MOSFET (for the embodiment illustrated in FIGS. 3 and 4A) conducting for 120° per cycle "T" corresponding to a complete cycle along the upper and lower envelope of voltage waveforms 40–42. When the phase order of the input signal is a-b-c, MOSFETS 22–27 conduct in pairs for six distinct time intervals of commutation. For example, referring to FIG. 4B, in a first interval 48, voltage waveform 40 (associated with phase a) is most positive while voltage waveform 41 (associated with phase b) is most negative. Thus, current flows from terminal 44 of transformer 38 through MOSFET 22, a load circuit 37, MOSFET 26 and back to terminal 45. During a second interval 49, voltage waveform 40 continues to be most positive while voltage waveform 42 (associated with phase c) now becomes most negative. Thus, the current passing back to transformer 38 at the end of first interval 48 continues out of terminal 44 through MOSFET 22, load circuit 37, through MOSFET 27, and back to terminal 46. As shown in the table of FIG. 4C, the pattern continues through the third to sixth intervals 50–53 with pairs of MOSFETs conducting in the order of (23 and 27), (23 and 25), (24 and 25), and (24 and 26), at which time the pattern is repeated. As a result, the output voltage waveform 46, shown in FIG. 4B, approximating a DC output is provided across load circuit 37.

MOSFETs 22–27 are here, for example, commercially available high voltage (600 V) n-channel MOSFETs (Model No. ATP6030BN, available from Advanced Power Technology, Bend, Oreg.) having a maximum current rating of 23A. It has been observed that certain MOSFET devices exhibit significantly improved thermal and electrical properties when operated at cryogenic temperatures. For example, the thermal conductivity of semiconductor materials (e.g., silicon, germanium, and GaAs) can increase by factors from 5–10 times when cooled to a temperature of 77° K. (This phenomena has also been observed with certain substrate materials, for example, beryllium oxide). As a result, the internal junction temperatures of the MOSFET devices are significantly reduced. Moreover, MOSFETs having low-doped silicon drain-drift regions (such as the Model APT6030BN device) have significantly increased electron and hole mobilities at cryogenic temperatures. Thus, the on-resistance (i.e, the drain to source resistance) of such high voltage MOSFETs decreases by a factor from 10–30 in the rated current range. MOSFETs also have the important characteristic of not having an intrinsic drain-source on-state threshold voltage. Thus, the on-resistance and voltage drop across the MOSFET can be made arbitrarily small by using a number of MOSFET devices connected in parallel. Other devices (e.g., IGBTs, GTOs, thyristors) are unable to take advantage of this feature because of their intrinsic on-state voltage drop characteristics.

Another important advantage of cryogenically cooling MOSFET devices is related to the problem of "line notching". Line notching, which is particularly troublesome in high power applications, occurs in commutation configurations, such as the one described above in conjunction with FIGS. 4A–4B in which current is commutated from one switching device to another. This current transfer thus means that the switching device which is about to stop conducting, and the switching device which has just started conducting are both "on" at the same time; and there is an overlap of the conduction periods. This overlap causes an abrupt reduction in the mean rectified voltage and a large current surge from the AC source. The surge appears as a "notch" on each source phase due to the voltage drop across the source impedance. Such notches represent harmonic distortion of the waveform and lead to the appearance of voltage and current components, as well as power flow, at undesired frequencies. Other equipment operating from the same AC phases may be disrupted or damaged by such notches and the harmonic frequencies they generate. It has been observed that cryogenically cooling MOSFETs significantly reduces the reverse recovery time, and thus the overlap interval to the extent that it is virtually eliminated. As a result, special filters for reducing harmonics generated during the notching intervals can often be simplified.

Figure 5:
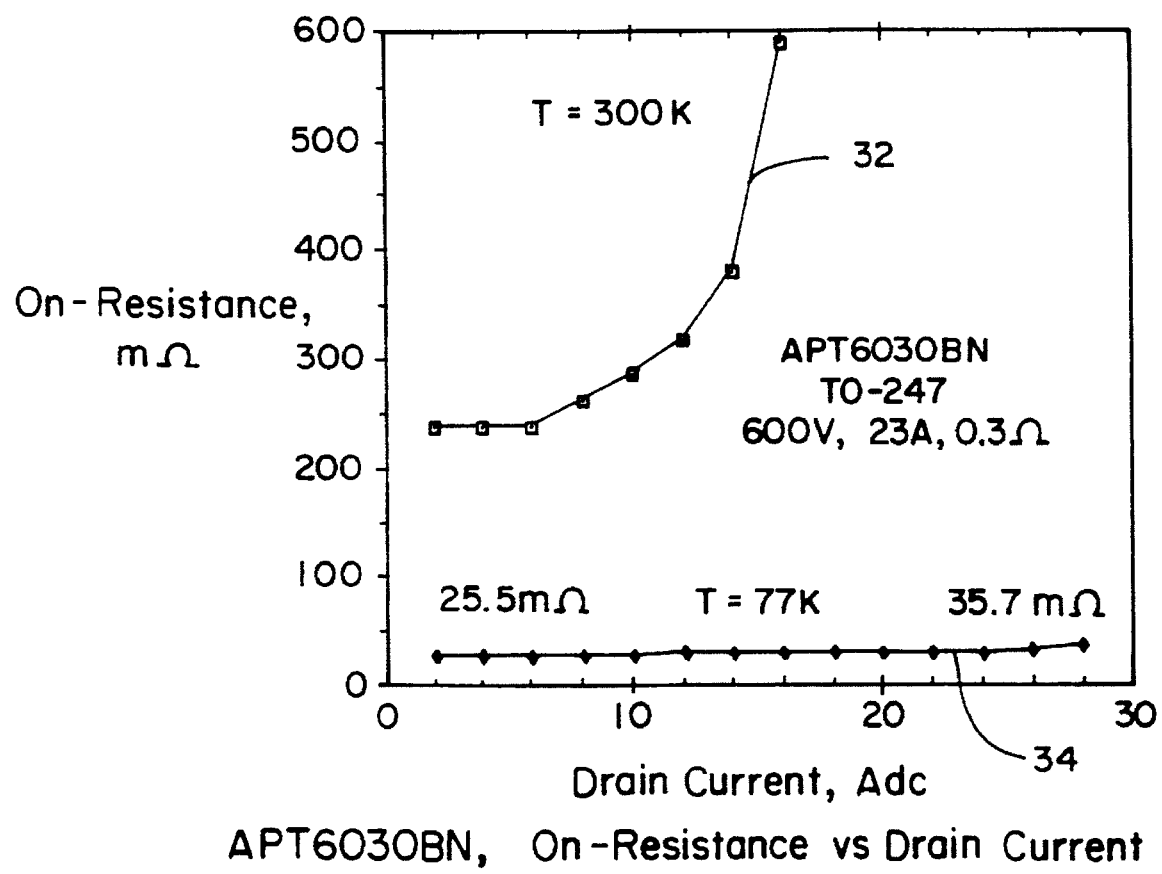
FIG. 5 is a plot showing the on-resistance in milliohms as a function of drain current in amperes-DC for a commercially available MOSFET device at both cryogenic and ambient temperatures.

Referring to FIG. 5, for example, the on-resistance as a function of drain current for the Model APT6030BN MOSFET device mounted on a heat sink is shown measured at both room temperature 300° K (curve 32) and immersed in liquid nitrogen at 77° K (curve 34). Curve 32 indicates that when operated at room temperature, the on-resistance increases at a fairly rapid rate when operated at current levels above 10A. With this increase in on-resistance comes a substantial increase in the power dissipated within the device itself, leading to a thermal runaway condition and eventually "burn out" of the device. However, when the Model APT6030BN MOSFET device is cryogenically cooled to 77° K, its on-resistance remains substantially unchanged for drain current levels ranging from 2 A to well above 20 A.

Figure 7:
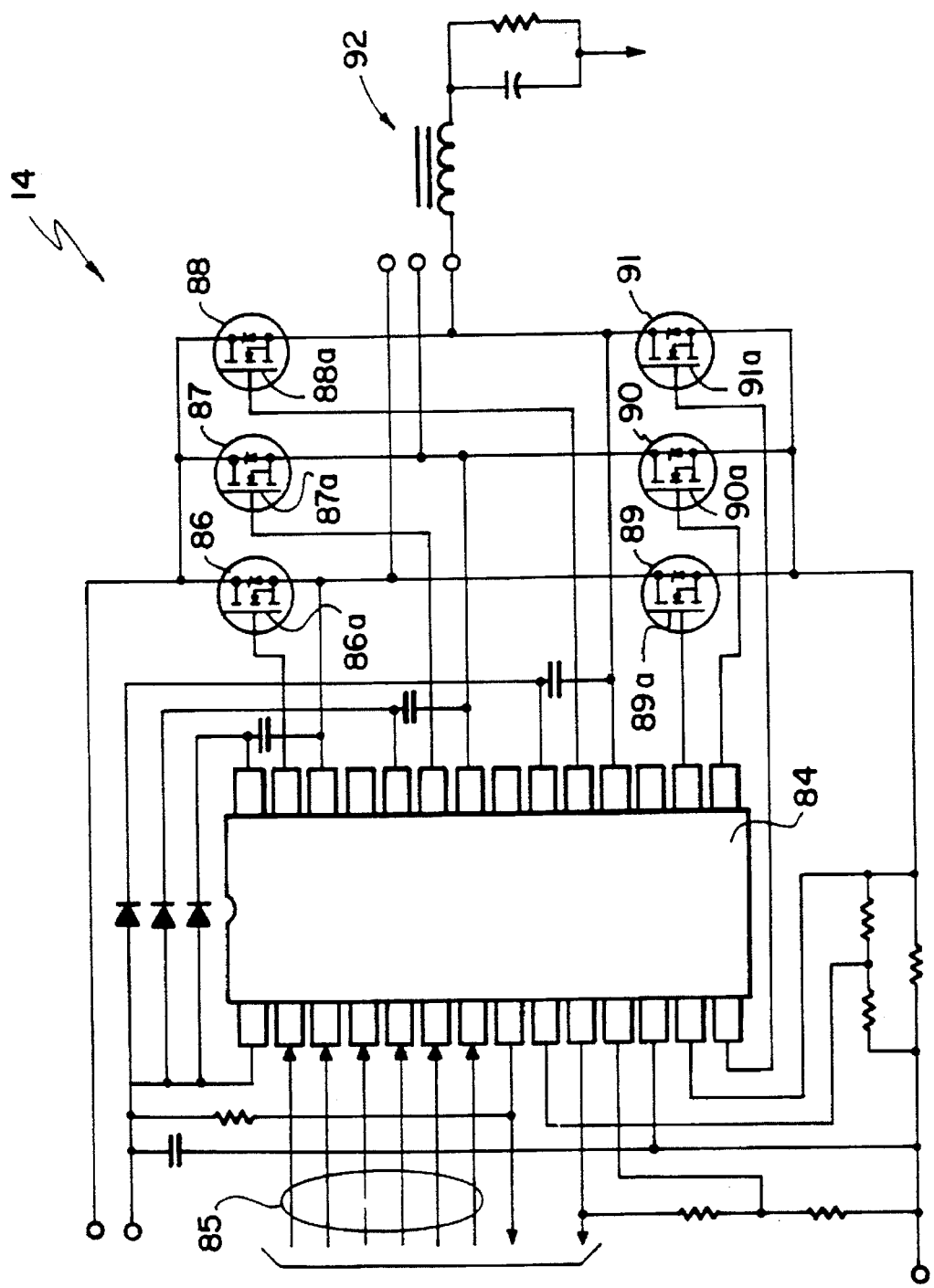
FIG. 7 is a schematic diagram of a DC/AC inverter circuit of the power electronics assembly.

Referring again to FIG. 3, each MOSFET device 22–27 includes a built-in drain-source diode 36 provided intrinsically in the fabrication of the MOSFET device. In the cooled condition, the MOSFET device with intrinsic drain source diode behaves like a FREDFET™ (fast recovery epitaxial diode FET) and provides an important advantage in the operation of synchronous rectifier 20 or inverter 84 (FIG. 7). Commercially available high current, high voltage rectifier diodes are notoriously slow. For example, a 400 V, 1600 A device typically exhibits a recovery time of five microseconds compared with a typical 20 nanosecond fast recovery device available for low current signals. In the event that one or more of MOSFET devices 22–27 fails to switch (due to problems with driver 19, control circuit 21 or the MOSFET itself) diode 36 provides rectification of the AC current passing through the device. In effect, diode 36 serves as a "back up" rectifier for the switching MOSFET, albeit, with a higher loss. A diode serving this purpose is generally required to be added externally for other types of devices (for example, IGBTs, GTOs, thyristor diodes) used in high power rectifier circuits. Cryogenically cooling the MOSFET devices dramatically reduces the reverse recovery time of drain source diode 36. It is important to note that in synchronous rectification the intrinsic diode of the MOSFET is not used and plays no direct role in the operation of the MOSFET. Indeed, although it is desired that the built-in drain-source diode 36 never be used because of its slow switching speed, if the MOSFET fails to switch, this decrease in speed is lessened due to the device being cooled. Operating the MOSFET at cryogenic temperatures helps to insure that in normal operation the intrinsic diode does not conduct. This is because the forward voltage of the intrinsic drain source diode at 77° K is greater than the forward voltage exhibited at 25° C. An additional benefit of cryogenic operation of the MOSFET is an effective extension of the safe operating area (SOA) characteristic of the device due to the reduction of power dissipation in the MOSFET at a specified drain current achieved by cooling the device. High pulse power throughput can be sustained by the cooled MOSFET without reaching those junction temperatures which may result in damaging the device.

Each MOSFET 22–27 is driven by gate drive circuit 19 which is controlled by a corresponding logic control signal for determining the appropriate timing for switch commutation in the rectifier topology. Control circuit 21 (FIG. 6) is galvanically isolated from three-phase input mains 57–59 and electrically isolated from gate driver circuit 19 to enable the drivers to float with respect to the potential on AC input mains 57–59. Moreover, a source of electrically isolated power is supplied by the control circuit to operate the gate drive circuit 19.

Figure 6:
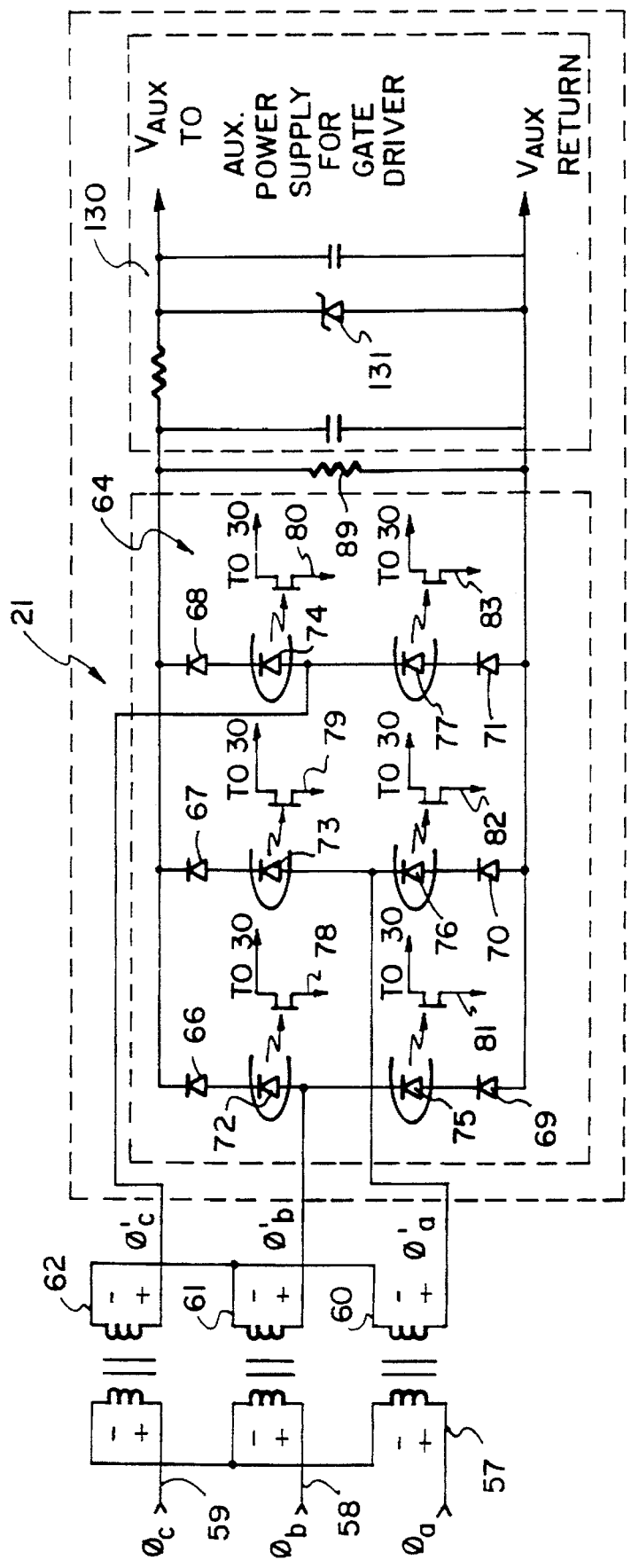
FIG. 6 is a schematic diagram of the control circuit for the synchronous rectifier circuit of FIG. 3.

Referring to FIG. 6, the three phases a, b, c from AC mains 57–59, respectively, are stepped down with small isolation transformers 60–62 to a small fraction (e.g., roughly one tenth), of the input voltage. Transformers 60–62 galvanically isolate control circuit 21 from AC mains 57–59, and provide reduced amplitude and phase-synchronized replicas of the mains phases a, b, and c to control circuit 21. These reduced amplitude replicas of the main phases, in combination and at any given time, constitute timing signals, which, as will be described below, are used to generate the control signals for switching MOSFETs 22–27 of rectifier 20.

Control circuit 21 includes a control bridge rectifier 64 which is configured to have a topology analogous to that of three-phase synchronous rectifier 20. Control bridge rectifier 64 includes conventional switching diodes 66–71 which operate at low power levels and exhibit the natural commutation intervals of a conventional diode rectifier of the same three-phase topology. Thus, the conduction interval of each diode 66–71 is used to directly derive an electrically isolated control signal for an associated one of power MOSFETs 22–27 in synchronous rectifier 20. In essence, a low power auxiliary bridge rectifier circuit is used to "mimic" the operation of the substantially higher power three-phase synchronous rectifier 20 in order to derive the proper timing for switching each of MOSFETs 22–27.

Each switching diode 66–71 is coupled in series to a corresponding light emitting diode 72–77 of a photocoupler. Thus, as commutation of diodes 66–71 of control rectifier 64 occurs, a pulse of current in the corresponding photocoupler light emitting diode is simultaneously generated. The magnitude of the current pulse in the light emitters is determined for the most part by the value of a resistor 89 which acts as a load for the control bridge. Receptors 78–83 for each light emitting diode 72–77 are MOSFETs or JFETs, operational at cryogenic temperatures, that operate as photocontrolled high speed switches, and, when activated, provide a drive logic input along input lines 30 (FIG. 3) to gate driver circuit 19. Driver circuit 19 generates drive signals at gates 22a–27a of associated cryo-cooled power MOSFETs 22–27 of rectifier 20 in accordance with activated ones of receptors 78–83 occupying the corresponding position in control circuit 21. In this way, synchronous rectifier 20 is forced to exhibit commutation analogous to that of the control bridge rectifier 64.

Furthermore, cryogenically cooled control circuit 21 provides a significant improvement in its performance. For example, the light emitting efficiency of light emitting diodes 72–77 is increased by as much as tenfold at cryogenic temperatures; thus drive current, and hence, operating current levels in control bridge rectifier 64 can be reduced for the same light coupling efficiency. The sensitivity to light, of receptors 78–83, is also increased at cryogenic temperatures. Moreover, because receptors 78–83 are MOSFET or JFET devices, their switching speeds are increased, and their drain-source resistances are decreased.

Control circuit 21 also includes an auxiliary power supply 130 for supplying a floating isolated low level DC power (for example, +15 v) which is required to operate drive 19 (FIG. 3). As shown in the FIG. 6, the regulator is a zener diode 131, but in other embodiments might be an active three terminal voltage regulating device.

Referring to FIG. 7, the load for rectifier 20 is a three-phase DC/AC pulse width modulated (PWM) inverter 14 shown having a topology generally the same as that of rectifier 20. Control circuit 21 described above in conjunction with the synchronous rectifier (FIG. 3) may additionally be used to control inverter 14 which generates the polyphase AC from a DC link voltage. In this application, however, the reference phases are not derived from the input signals, as described above in conjunction with the polyphase rectifier. Instead, the reference phases are generated at a low level as a signal from an oscillator or are derived from an oscillator which is phase locked to the utility mains frequency; and control signals are generated so that a stepped version of the desired polyphase power outputs is produced at the rectifier phases. Used in this way, the power is applied in the form of a DC voltage source to what would normally have been the rectified output of the synchronous rectifier, and the polyphase outputs are taken from its normally used AC inputs. Control signals generated in this way are provided on lines 85 to drive 84 which provides drive signals to gates 86a–91a of MOSFETs 86–91.

Alternatively, a microcontroller (not shown) can be programmed to provide the appropriate switching sequence of MOSFETs 86–91 and to provide control signals to driver circuit 84, accordingly. The output of each of MOSFETs 86–91 appear as a pulse width modulated signal with a low pass filter 92 recovering the envelope of the pulse width modulated signals to produce a waveform having a desired amplitude, frequency and phase. The microcontroller 128 in conjunction with low voltage and current sensors (not shown) operates in a closed-loop control mode to provide load regulation and fault protection. In utility applications, three AC sinusoidal waveforms of equal amplitude, frequency, and a differential phase shift of 120° are generated.

Figure 8:
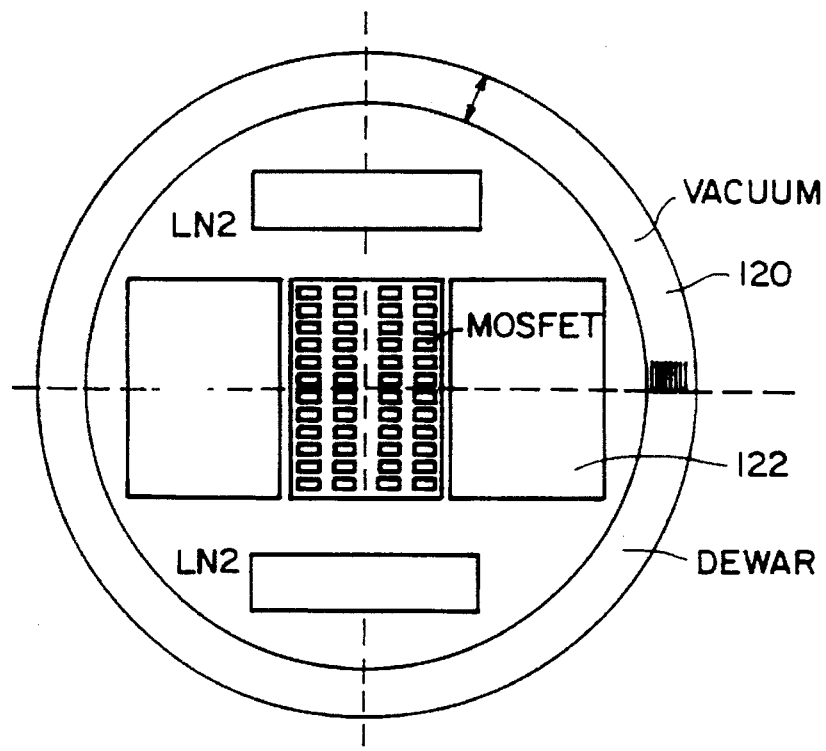
FIG. 8 is a top view of the cryogenic power conversion system and refrigeration device of FIG. 2.
Figure 9:
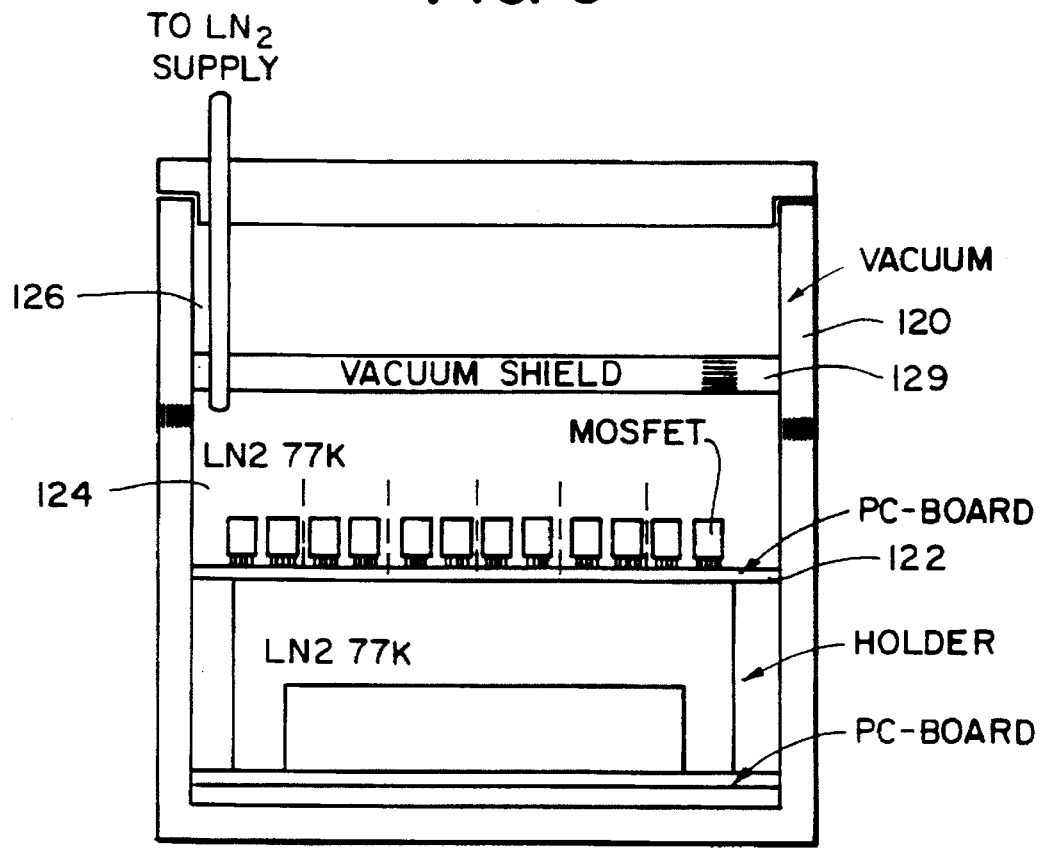
FIG. 9 is a cross-sectional side view of the cryogenic power conversion system disposed within a cryogenically cooled refrigeration device.

Referring to FIGS. 8 and 9, synchronous rectifier 20 is shown cryogenically cooled within a dewar 120. Dewar 120 includes a cryogenically cooled lower compartment 124 filled with liquid nitrogen and thermally insulated from an uncooled upper compartment 126 by a vacuum shield 129 or other insulation. Although liquid nitrogen is the preferred cryogen, for economic reasons, any cryogenic fluid or mechanical cryo-refrigerator can be used. Printed circuit boards 122 for rectifier 20 as well as driver 19 and control circuit 21 are all immersed within the liquid nitrogen. Similarly, inverter 14 may be cryogenically cooled with components non-operational at cryogenic temperatures, for example, microcontroller 128, being positioned in upper compartment 126. Generally, the power conversion electronics require a relatively small amount of additional space over that required for the large superconducting inductor windings used as a DC link and/or filter.

Although the concept of cryogenically cooling the power conversion electronics is applicable to any system where it is desired to reduce the losses associated with converting the electrical signals in one form to another, the approach described above has particular application for power generation systems in which the source of energy is intermittent or constantly fluctuating. Such sources of energy include, for example, solar, geothermal, tidal, and wind power.

Cryogenically cooling the power electronics used for converting variable frequency, variable phase AC input signals generated by a number of wind-driven turbines can significantly improve the efficiency and reliability of a wind farm system.

Figure 10:
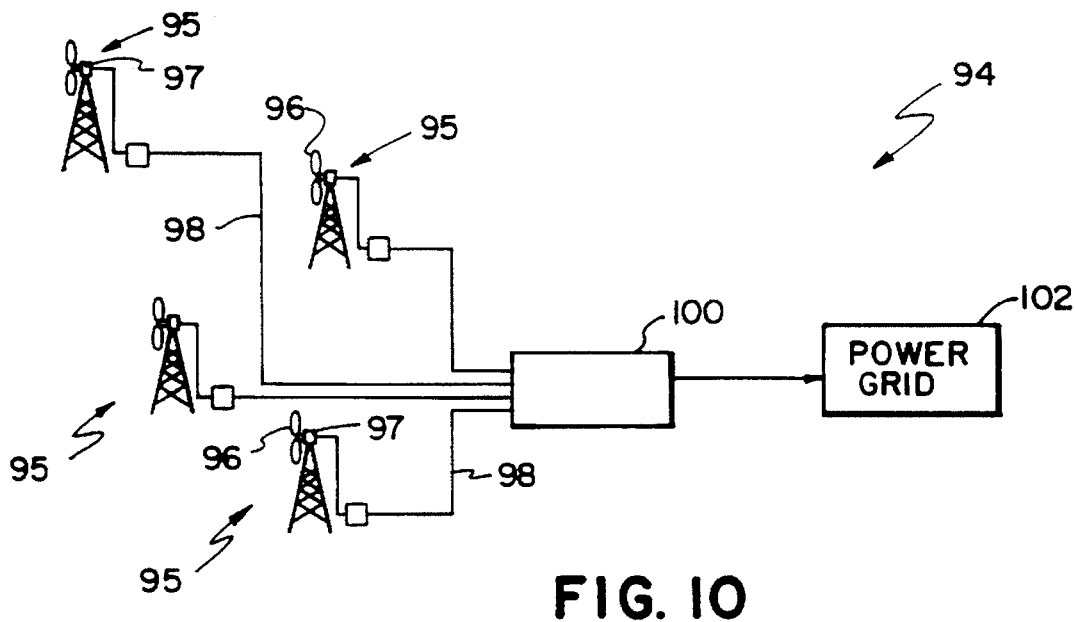
FIG. 10 illustrates a centralized power electronics station connected to a number of wind-driven turbines in a wind power generation system.

Referring to FIG. 10, a wind farm power generation system 94 is shown having a number of wind machines 95 located in an area (e.g., mountain pass or coastal flat plain) where average wind speeds are relatively high. Each wind machine 95 includes a rotor/blade assembly 96 mounted on a shaft which drives a variable speed turbine 97. In some wind power generating systems, for example, variable speed turbines (VSTs) are used to generate AC at varying frequencies, ranging from 20 Hz to more than 100 Hz. The variable-speed turbine 97 allows the rotor speed to follow the wind speed over a wide range of operating conditions, maintaining the rotor-to-wind speed ratio constant. Variable speed turbine 97 rotates at the speed of the rotor to generate AC at frequencies (ranging from 20 Hz to more than 100 Hz) and phases dependent on the speed of rotor 96. AC-DC-AC rectification/inversion is generally used to condition the variable frequency AC generated by variable speed turbine 97 to be frequency and phase consistent with a power grid 102 from which users obtain electricity. The fluctuating frequency AC is transmitted, over lines 98 to a centralized power station 100, where, as will be described below, the AC energy of each wind machine 95 is converted to DC, added together, and then reconverted (inverted) to AC at a fixed frequency of 60 Hz before being made available to users on power grid 102. Lines 98 may be fabricated from high temperature superconducting materials and cryogenically cooled to reduce losses between individual wind machines 95 and power station 100.

Figure 11:
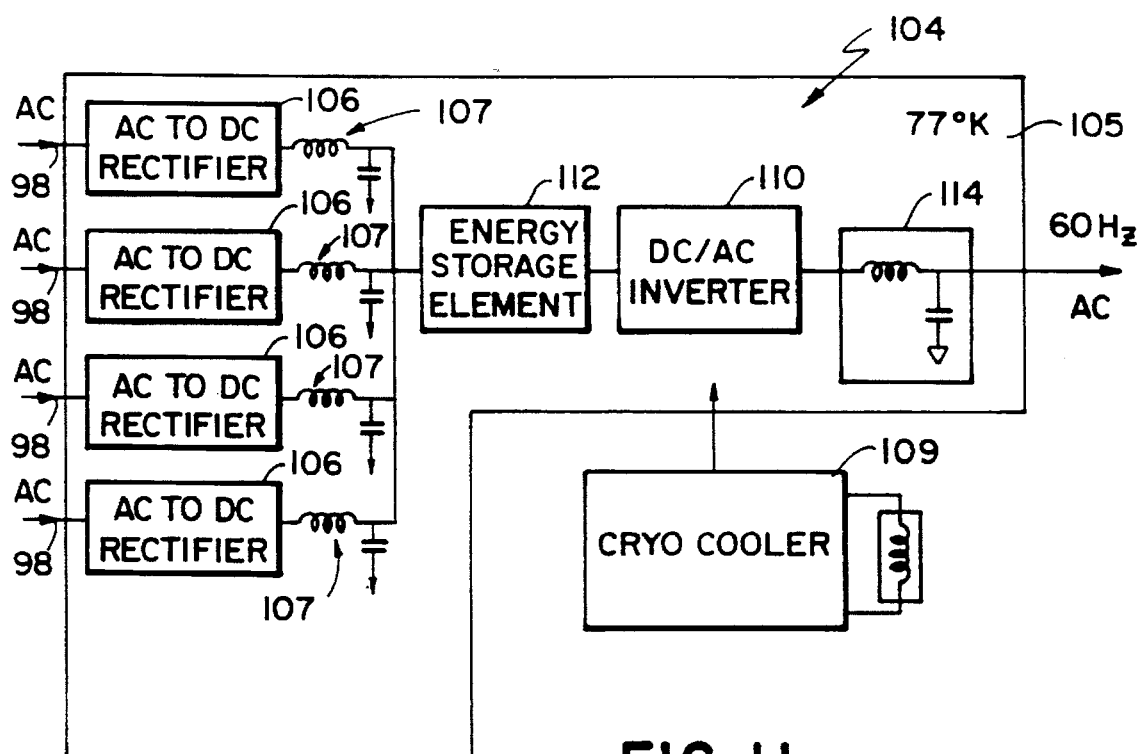
FIG. 11 is a block diagram of a cryogenically cooled power conversion system including a number of AC/DC rectifier circuits.

Referring to FIG. 11, a power electronics assembly 104 for providing the AC-DC-AC conversion is shown cryogenically cooled within a relatively compact cryo-container 105. In the wind farm application, described above in conjunction with FIG. 10, power electronics assembly 104 is located within power station 100. Cryo-container 105 is maintained at a temperature of 77° K, in a liquid nitrogen environment, with a reliable cryo-refrigeration unit 109 which may be positioned proximately to cryo-container 105, but is more likely situated at a location away from cryo-container 105. When lines 98 are superconducting transmission lines, refrigeration unit 109 may be used to provide cooling to lines 98. Power electronics assembly 104 includes individual AC/DC rectifiers 106 which receive the variable frequency AC from corresponding variable speed turbines 97. An LC filter network 107 is coupled to the output of each rectifier 106 to reduce ripple and to make each rectifier appear as a current source. Filter 107 is coupled to an energy storage element 112, such as a DC link high temperature superconductor (HTS) inductor, so that the converted DC from each rectifier 106 is easily summed to provide an aggregate DC level. The aggregate DC is received by DC/AC inverter 110 from the energy storage element 112 which stores enough energy to maintain a fairly constant flow of power to inverter 110. In general, energy storage element 112 must provide at least enough energy for one-half cycle for each phase of the AC output power. A low-pass filter 114 is coupled to the output of DC/AC inverter 110 to reduce the harmonic content of the 60 Hz AC signal. Rectifier 106 and inverter 110 may be of the type described above in conjunction with FIGS. 3 and 7, respectively, and may use the control circuit 21 described above in conjunction with FIG. 6.) Alternatively, other control circuits including digital or magnetic control circuits may be used.

Figure 12:
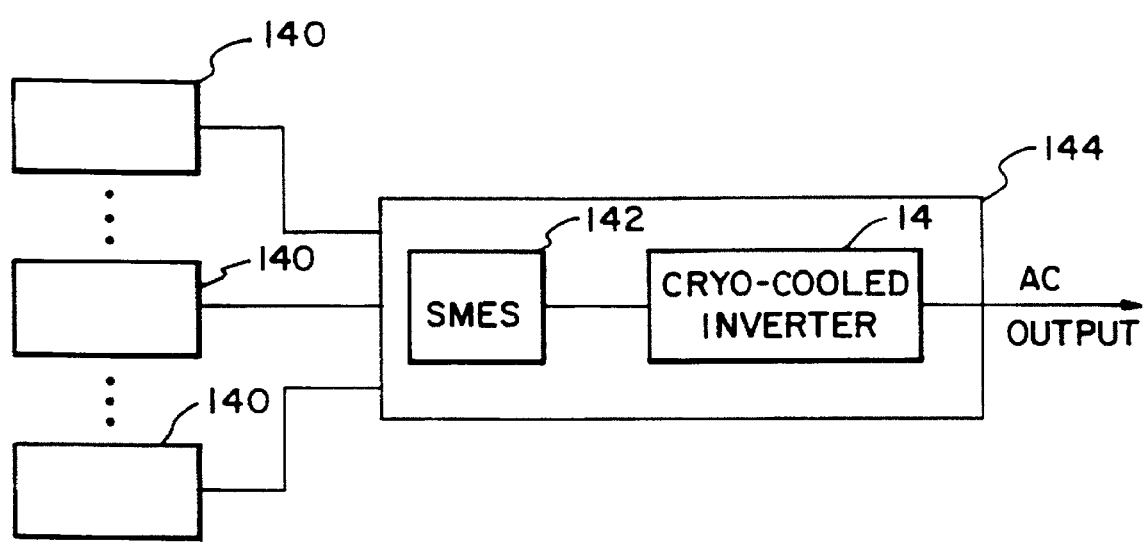
FIG. 12 illustrates a centralized power electronics station connected to a number of solar array stations.

Referring to FIG. 12, in another application, power electronics associated with converting fluctuating amplitude direct current input signals, for example, from a power generation system employing a multitude of solar panel arrays 140, can be cryogenically cooled to decrease losses. Unlike the wind farms application described above, DC inputs from individual solar arrays are used to charge a cryogenically cooled SMES device 142 at a centralized power station 144 during periods of light which is then discharged according to demand, for example at night. Where AC is required, a cryogenically cooled DC to AC inverter 14, like the one described above in conjunction with FIG. 7, may be used to convert the stored DC into an AC output.

Other embodiments are within the scope of the claims. For example, cryogenic cooling of the circuits and components described above may be accomplished using any of a variety of active refrigeration units or passive cooling baths and, where necessary, may use any of a variety of cooling liquids, in addition to liquid nitrogen as described above. Other embodiments may use liquid cryogens at temperatures other than 77° K.

It is also important to appreciate that any number of commercially available MOSFET or static induction transistors (SITs) may be substituted for MOSFETs 22–27 as described above depending on the application and power levels involved.

Moreover, DC link inductor 16 or energy storage element 112 as discussed above in conjunction with FIGS. 1 and 11, respectively, may be replaced with other suitable energy storage devices. For example, a cryogenic capacitor may be coupled in parallel between converter 12 (rectifiers 106) and inverters 14, 110. Alternatively, a superconducting magnetic energy storage (SMES) device may be substituted. In general, a SMES can be used to provide longer term storage of DC energy provided by a converter. For example, energy can be stored in the SMES overnight and then discharged during the day when demand for use is higher. The use of a SMES also has particular advantages in applications, such as the wind farm application discussed above in conjunction with FIGS. 10 and 11. In a wind farm application, the SMES is used to provide short-term averaging of the fluctuating DC input supplied by the rectifying converter circuit(s). The SMES stores energy during peak DC output levels (when the wind velocity is high) and discharges the store of energy when the output level drops below a desired average level.

With respect to control bridge rectifier 64 shown in FIG. 6, light emitting diodes 72–77 may be coupled using fiber optic light guides to remote receptors residing in close proximity to the power MOSFET rectifiers. As mentioned above, cryogenic cooling of the light emitting diode also increases the quantum efficiency and hence the light output of diodes 72–77. This is advantageous in applications where a large number of paralleled MOSFETs are fabricated as an integrated high power array and are directly triggered with the fiber optic light guides. In such applications, driver circuit 19 is no longer necessary. Moreover, in some applications, each light emitting diode 72–77 and associated receptor 78–83 may be replaced with a magnetic coupling means, such as small pulse transformers which provide the necessary drive logic input signals along lines 30 to gate driver circuitry 19.

Referring again to FIGS. 10 and 11, in an alternative embodiment, cryogenically cooled rectifiers 106 and their associated electronics (control circuits, filters) are positioned within individual wind machines 95. Lines 98, in this embodiment, are cryogenically cooled DC superconducting transmission lines and convey the rectified DC from each rectifier 106 to energy storage element 112 and inverter 110 located within power station 100. In applications where DC is generated, for example with solar panel arrays, rectifiers 106 are not required and the generated DC energy is transmitted through lines 98 directly to energy storage element 112 and inverter 110 for conversion to AC before being applied to power grid 102.

What is claimed is:

1. A power generation system comprising:
   power generators, each generating alternating current input signals having a naturally occurring, fluctuating frequency characteristic,
   power conversion circuitry for converting the alternating current input signals into a direct current output signal, said power conversion circuitry including rectifier circuits, each rectifier circuit converting the alternating current input signals into direct current signals;
   a combiner circuit for summing the direct current signals from each of said rectifiers to provide a total direct current signal; and
   a superconducting energy storage device coupled to an output of said combiner circuit; and
   a cryogenic cooling system for cooling said power conversion circuitry.

2. The power generation system of claim 1 wherein said plurality of alternating current input signals are generated by variable speed turbines.

3. The power generation system of claim 1 wherein said power conversion circuitry is a polyphase switching conversion circuit, said rectifier circuits including a plurality of switching devices, and said plurality of alternating current input signals have a differential phase shift relationship with respect to each other, said plurality of switching devices of said rectifier circuits being responsive to said control signals for applying a selected pair of a plurality of alternating current input signals across an output of said conversion circuit.

4. The power generation system of claim 1 wherein the superconducting energy storage device is an inductor winding composed of a high temperature superconductivity material.

5. The power generation system of claim 1 wherein the energy storage device is a cryogenic capacitor.

6. The power generation system of claim 1 wherein the energy storage device comprises a superconducting magnetic energy storage.

7. The power generation system of claim 1 wherein said combiner circuit comprises filter networks, each filter network having an input coupled to an output of an associated rectifier circuit and an output coupled to said superconducting energy storage device.

8. The power generation system of claim 1 further comprising a cryogenically cooled transmission line for conveying said direct current output signal to a remote load.

9. The power generation system of claim 2 wherein said variable speed turbines are driven by a natural energy source.

10. The power generation system of claim 3 wherein said differential phase shift between said alternating current input signals is 120°.

11. The power generation system of claim 3 further comprising a digital control circuit for controlling said polyphase switching conversion circuit.

12. The power generation system of claim 3 further comprising a control circuit for controlling said polyphase switching conversion circuit, said control circuit comprising a plurality of switching elements, each generating a control signal to a corresponding one of said switching devices for applying at least one input signal across an output load of said converter circuit, said control signals being electrically isolated from said input signals.

13. The power generation system of claim 7 wherein each of said filter networks is a low pass filter.

14. The power generation system of claim 9 wherein said power generators are solar panel arrays.

15. The power generation system of claim 9 wherein said natural energy source is wind.

\* \* \* \* \*